United States Patent [19]

McKenna et al.

[11] Patent Number: 5,647,892

[45] Date of Patent: Jul. 15, 1997

[54] METHOD FOR ACID GAS EMISSION CONTROL

[75] Inventors: John D. McKenna, Rocky Mount; Kenneth W. Appell; John C. Mycock, both of Roanoke; Joseph F. Szalay, Braxburg, all of Va.

[73] Assignee: ETS International, Inc., Roanoke, Va.

[21] Appl. No.: 709,158

[22] Filed: Sep. 6, 1996

Related U.S. Application Data

[62] Division of Ser. No. 333,343, Nov. 2, 1994.

[51] Int. Cl.$^6$ .............. B01D 53/02; B01D 53/06; B01D 53/12

[52] U.S. Cl. .............. 95/110; 95/137; 96/123; 96/150; 96/152; 423/244.01; 423/244.07; 423/244.08; 422/171; 422/177; 422/176; 422/211; 422/216

[58] Field of Search .............. 422/171, 176, 422/177, 191, 211, 216, 239; 96/123, 150, 152; 95/109, 110, 137; 423/244.01, 244.07, 244.08

[56] References Cited

U.S. PATENT DOCUMENTS

| | | | |
|---|---|---|---|
| 2,493,218 | 1/1950 | Bergstrom | 422/147 |
| 3,708,266 | 1/1973 | Gustavsson | 422/178 |
| 3,708,981 | 1/1973 | Johswich et al. | 95/110 |
| 3,716,969 | 2/1973 | Maeda | 96/150 |
| 3,976,747 | 8/1976 | Shale et al. | 523/244.08 |
| 4,003,711 | 1/1977 | Hishinuma et al. | 422/178 |
| 4,149,858 | 4/1979 | Noack et al. | 95/110 |
| 4,179,399 | 12/1979 | Lichtenberger et al. | 502/56 |
| 4,201,695 | 5/1980 | Juntgen et al. | 502/56 |
| 4,207,290 | 6/1980 | Lee | 422/111 |
| 4,246,235 | 1/1981 | Rogers | 422/198 |
| 4,254,557 | 3/1981 | Mayer et al. | 422/216 |
| 4,254,616 | 3/1981 | Siminski et al. | 422/216 |
| 4,333,751 | 6/1982 | Iwamura et al. | 96/150 |
| 4,349,362 | 9/1982 | Tanaka et al. | 96/150 |
| 4,442,080 | 4/1984 | Donnelly et al. | 423/239.1 |

(List continued on next page.)

FOREIGN PATENT DOCUMENTS

| | | |
|---|---|---|
| 40 32 738 | 1/1992 | Germany. |
| 42-26166 | 12/1942 | Japan. |
| 54-56984 | 4/1979 | Japan. |
| 63-185433 | 8/1988 | Japan. |

OTHER PUBLICATIONS

Combustion Power Company, Inc., A Weyerhaeuser Company, "Clean Air. Simply. The Dry Scrubber. From Combustion Power." (no date).

*Primary Examiner*—Robert J. Warden
*Assistant Examiner*—Hien Tran
*Attorney, Agent, or Firm*—Bacon & Thomas

[57] ABSTRACT

An improved apparatus and process is provided for scrubbing sulphur oxide gas from combustion flue gas with wet limestone particles as a reactive scrubbing agent. The process is carried out in a moving bed reactor having louvered inlet and outlet sides which permit the flue gas to pass through the reactor while the limestone particles move downward. The flue gas may be flowed through the moving bed reactor at a high velocity to permit scrubbing of large volumes of gas in a thorough and efficient manner. The high velocity of flue gas passing through the reactor causes some of the scrubbing particles to be ejected from the outlet side of the reactor. Problems associated with the ejection of the scrubbing particles are avoided by providing a slot alongside the outlet side of the reactor. The slot is sized so that the flue gas passing therethrough will have insufficient velocity to entrain the ejected scrubbing particles therein. Consequently, the particles will fall to the bottom of the slot where they can be recovered and recycled. As a result of the slot associated with each reactor, the apparatus may be operated under conditions which would not otherwise be possible so that the scrubbing capability of the limestone particles can be maximized.

12 Claims, 5 Drawing Sheets

U.S. PATENT DOCUMENTS

| | | | |
|---|---|---|---|
| 4,622,210 | 11/1986 | Hirschberg et al. | 422/144 |
| 4,663,136 | 5/1987 | Furlong | 423/239.1 |
| 4,670,226 | 6/1987 | Furuyama et al. | 422/216 |
| 4,764,348 | 8/1988 | Furlong | 422/178 |
| 5,077,024 | 12/1991 | Janka | 423/244.07 |
| 5,112,588 | 5/1992 | Staudinger et al. | 423/244.03 |
| 5,160,708 | 11/1992 | Kodama et al. | 422/171 |
| 5,169,607 | 12/1992 | Krambrock et al. | 422/219 |

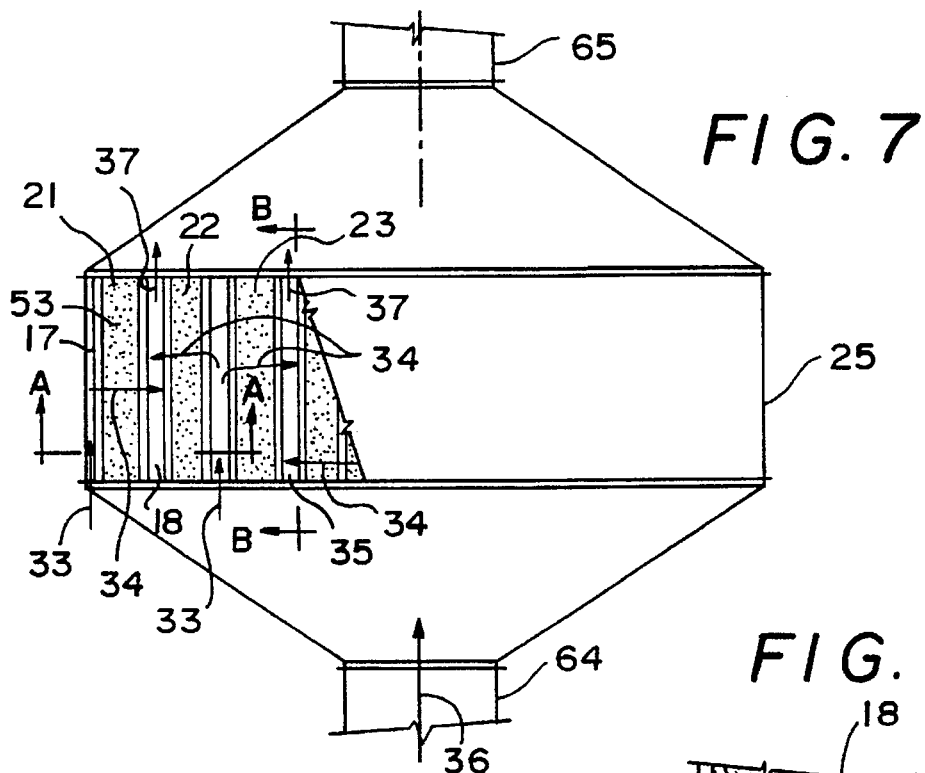
FIG. 7
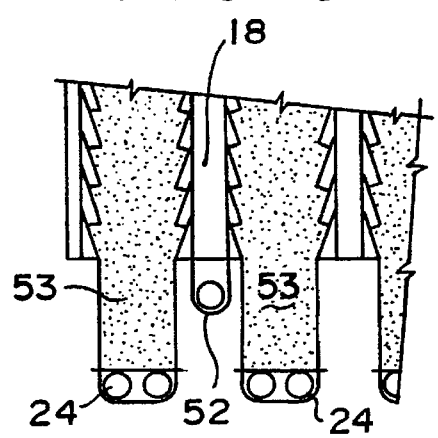
FIG. 8
FIG. 9
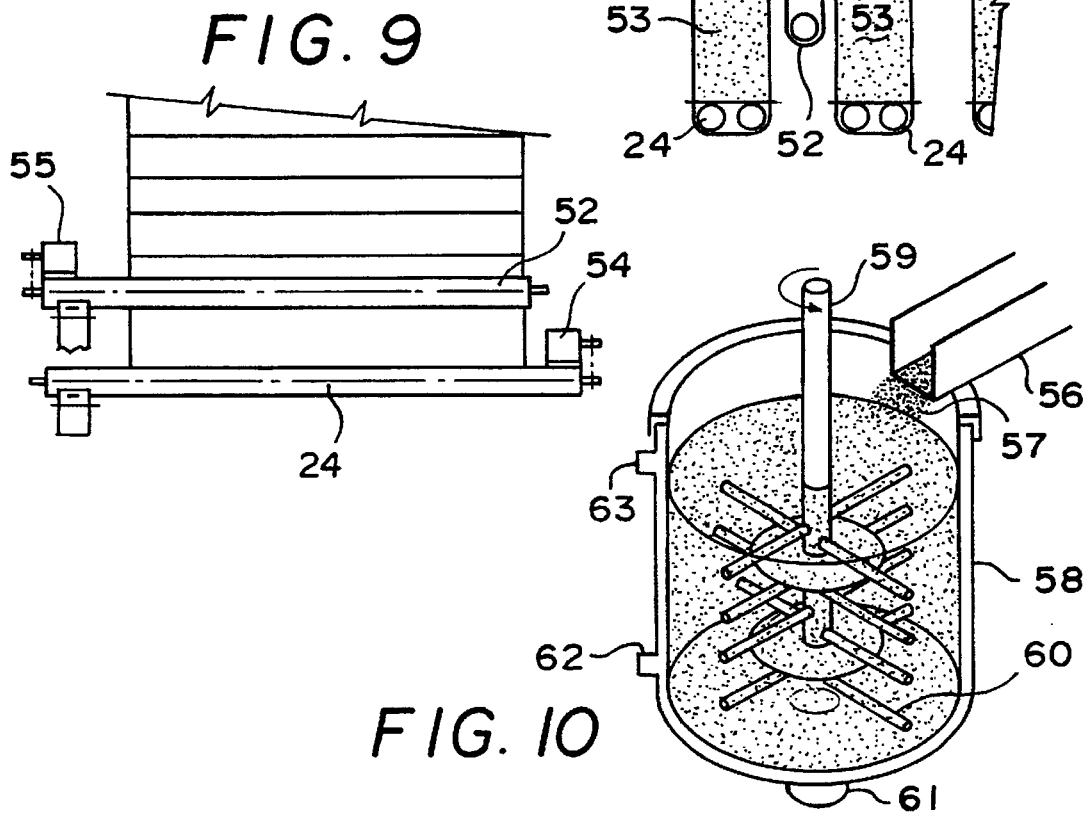
FIG. 10

METHOD FOR ACID GAS EMISSION CONTROL

This application is a divison of application Ser. No. 08/333,343, filed Nov. 2, 1994.

BACKGROUND OF THE INVENTION

1. Field of the Invention

The present invention relates to the art of controlling the emissions of acid gas, particularly sulphur oxides ($SO_2$ and $SO_3$) from flue gases produced in a coal fired boiler. Sulphur oxides are formed when coal containing sulphur is burned in a furnace. The combustion process results in the production of hot flue gas which contains unacceptable levels of $SO_2$ and/or $SO_3$. These sulphur oxides are generally eliminated or reduced to acceptable levels by scrubbing the flue gas with particulate scrubbing materials such as limestone granules. Typically, the flue gas containing sulphur oxide is scrubbed by passing the flue gas through a bed of wet limestone which reacts with the sulphur oxide contained in the flue gas to produce a solid reaction product (calcium sulphate and calcium sulphite). The production of a solid reaction product containing sulphur effectively removes the gaseous sulphur compounds from the flue gas.

The solid reaction product forms a crust around the limestone particles which must be periodically removed because the presence of the crest produces a surface blinding effect which interferes with the reaction between the scrubbing particles and the sulphur oxides. Thus, the particles containing a crust of reaction product are periodically regenerated by removing the crust so as to expose a fresh surface of scrubbing material for reaction with the sulphur oxides.

The present invention relates to an improvement in the configuration of a moving bed of wet scrubbing material which permits the scrubbing to proceed in a highly effective and efficient manner.

2. Description of the Prior Art

The prior art generally relies upon the use of a bed of wet limestone particles for scrubbing the sulphur oxide from the flue gas. Generally, fixed beds are used such as described in U.S. Pat. Nos. 4,663,136 and 4,764,348 (the specifications of which are incorporated herein by reference). However, such fixed beds cannot be operated continuously because of the need to periodically regenerate the limestone by removing the crust of calcium sulphate/sulphite therefrom so as to avoid the surface blinding effect. Such regeneration requires agitating the encrusted limestone particles to break off the crest of reaction product. Once the regeneration step has been completed, the bed can once again be used to scrub the sulphur oxide from the flue gas.

FIG. 1 shows a simplified flow schematic of a prior art fixed bed unit. In the unit shown in FIG. 1, flue gas enters a spray chamber 1 where it is conditioned to the desired temperature and humidity. Conditioning is achieved by adding water via an atomizing nozzle 2 and/or by injecting live steam into the chamber by means of injector 3. The conditioned flue gas enters a reactor 4 which contains the fixed bed of limestone which is preferably wet with just enough water so that the particles are coated with a film of water. The fixed bed of limestone may comprise a removable basket filled with limestone. The limestone may be wet by spraying with overhead sprayer 5. The flue gas passes downward through the fixed bed of limestone. Sulphur dioxide is absorbed from the flue gas into the water film where it subsequently reacts with dissolved limestone. It is this reaction which is believed to produce the crust of calcium sulphate and sulphite. The presence of a liquid water film on the limestone is critical since dry limestone does not readily react with sulphur oxides in the flue gas. The scrubbed flue gases are drawn out from the bottom of the limestone bed by an induced draft (ID) fan 6 and are returned to duct 7 leading to a stack for elimination into the atmosphere.

It is known to use a moving bed of limestone particles in the prior an for various purposes. One such apparatus is described in U.S. Pat. No. 3,976,746 (Shale et al.) However, Shale reports that the crest of reaction product must be periodically removed in order to regenerate the limestone for further reaction. The periodic removal, according to Shale, can be accomplished by mechanical agitation. In order to accomplish the required periodic regeneration of the limestone, Shale et al. provides a mechanical device such as a vibrating screen to remove the reaction crust from the limestone particles.

Whenever flue gas flows at a high velocity through a moving bed of scrubbing particles, such as the moving bed described by Shale et al., there is a tendency for the particles, especially the smaller particles, to be carried over and thereby removed from the bed due to the force of the flowing gas passing through the bed. The carry-over of the scrubbing particles results in an undesirable loss of limestone from the bed. Furthermore, the scrubbing particles which are lost due to "carry-over" will become entrained in the flow of flue gas unless special precautions are taken. Therefore, these carryover particles will be easily drawn into the ID fan which is typically present for assisting in the flow of gas through the system.

Shale et al. fails to provide any mechanical means for reducing the above-described carry-over of scrubbing particles. Thus if the operators of a $SO_2$ scrubbing device wanted to minimize the carry-over, they would have to install a screen or filter or reduce the mount of flow gas through the bed. Both of these approaches are undesirable. A filter or screen would become clogged over a period of time and produce an undesirable pressure drop across the bed. Reducing the gas flow would produce a commensurate reduction of efficiency.

It is known in the art to contain a moving bed of particles in a device having a series of louvers on the gas inlet and gas outlet side of the bed. The louvers may be designed with sufficient overlap to help contain the particles in the bed while allowing the gas to pass freely through the bed. FIG. 2 illustrates the basic configuration for a typical louvered moving bed.

Moving beds having louvers are disclosed, for example, in U.S. Pat. Nos. 4,670,226 (Furuyama et al.); 5,160,708 (Kodama et al.); 4,254,557 (Mayer et al.) and 4,254,616 (Siminski et al.)

The use of louvered moving beds per se without any modification have been shown to be inadequate in limestone emission control devices. For example, in early experimental work which lead to the present invention, it was determined that a LEC (limestone emission control) moving bed pilot plant which relied only on the louvers to retain the limestone in the bed did not accomplish this purpose. During operation, limestone from the bed was drawn in the outlet plenum and subsequently into the ID fan. In order to prevent this limestone loss from the bed and to protect the ID fan, a screen was attached to the inside (limestone bed side) of the outlet louvers in order to keep the limestone in the bed. However, the presence of the screen introduced another operational problem. In particular, damp fines were deposited on the screen which resulted in plugging and a significant increase in the pressure drop across the limestone bed. This plugging (i.e., blinding) of the screen occurred most rapidly at the top of the bed which is normally the most reactive part of the bed. As a result of the screen blinding at the top of the bed, the flue gas would begin to flow preferentially through the bottom portions of the bed which are normally the least active part of the bed. This action would result in a simultaneous increase in pressure drop across the bed, a decrease in $SO_2$ removal performance and a decrease in the flue gas flow rate.

Attempts have been made to minimize the carry-over problem by adjusting the size of the limestone particles. However, larger particles which may be sufficiently heavy to eliminate the carry-over problem are not as efficient as the smaller particles in their ability to remove sulphur oxides from the flue gas. Combinations of large and small particles have been observed to combine the worst features of both.

Attempts have also been made to overcome the carry-over problem by adjusting the design of the louvers. It would be expected that larger louvers with sufficient overlap would be adequate to avoid carry-over because louvered dry scrubbers containing similarly sized limestone are said to be useful for removing particles from a gas stream. However, it has been determined that using louvers sloped at 70° C. which are 11" long with a 3½" overlap failed to prevent carry-over.

Obviously, it would be advantageous to have the capability of scrubbing large quantities of gas in a short period of time. Thus, it is desirable to operate limestone emission control systems with a high flow rate of flue gas through the moving bed in order to attain this capability. However, higher flow rates are associated with a greater degree of particle carry-over especially when smaller more efficient sized particles are used. It would be desirable to be able to use smaller particles without the problems associated with carry-over because smaller particles have a higher surface area to volume ratio, and thus they will provide a more efficient scrubbing capability. As a result of this greater scrubbing capability, the system can effectively scrub flue gas having a high sulphur oxide content.

All of the attempts to eliminate the carry-over of limestone in an efficient moving bed limestone emission control system have proven to be inadequate. Thus, there exists a long felt need in the art to provide a solution to this problem without sacrificing the sulphur oxide scrubbing efficiency of a moving bed limestone emission control device.

SUMMARY OF THE INVENTION

It is an object of the present invention to provide an efficient limestone emission control system and moving bed therefor which can operate at high flue gas flow velocities to provide enhanced efficiency without the undesirable effect of particle carry-over in the system.

It is also an object of the present invention to provide an improved moving bed for a limestone emission control system which allows the use of small particles for enhanced scrubbing capability without the undesirable effects associated with limestone particle carry-over.

It is a further object of the present invention to provide a limestone emission control system and moving bed therefor which has the capability of regenerating the limestone particles therein without the need of a mechanical agitating device specifically installed for this purpose.

These and other objectives are achieved by providing a mechanism in combination with the limestone moving bed reactor for entrapping and recovering the carry-over particles which leave the bed. In a broad embodiment, the mechanism utilizes a slot on the downstream side of the louvered moving bed reactor for receiving the gas and carry-over particles from the moving bed. The slot is sized so that the gas flowing therethrough has insufficient velocity to entrain the carry-over particles. Consequently, the particles fall to the bottom of the slot for recovery so that the gas can exit the slot without any carry-over particles. Means for recovering the particles which collect at the bottom of the slot are provided to remove the particles therefrom so that they can be eventually returned to the reactor. A conventional screw conveyor which may be located at the bottom of the slot may be used for this purpose.

Of course, there may be some very small particles such as fines, removed reaction crust or other dust-like particles which may be formed due to attrition or abrasive forces on the scrubbing particles within the system. These small particles are not to be considered as carry-over particles for the purposes of this invention. Thus, while the outlet slob may be sized so that the carry-over scrubbing particles are not entrained in the gas flowing therethrough, it is possible that the small particles like the fines, dust, removed reaction crust, etc. will be small enough so that they will become entrained in the gas flowing through the outlet slot and consequently, these small particles will not fall to the bottom of the slot. Such particles may be removed by a screen.

The louvers are desirably designed so that they are large enough to provide sufficient overlap to minimize the amount of carry-over particles which leave the bed and enter into the slot. No filter or screen is required in the moving bed to help keep the particles therein and, in fact, such filters or screens are preferably avoided in the present invention since they tend to clog with wet limestone fines and thereby produce an undesirable pressure drop across the bed.

As a result of the present invention, a greater flue gas flow can be used without causing undesirable carry-over of scrubbing particles. Furthermore, the bed can be operated with smaller sized scrubbing particles without the undesirable effects associated with carry-over. The capability of being able to use smaller sized limestone particles (or equivalent particles for scrubbing sulfur oxides) results in improved efficiency due to the higher surface area to volume ratio of the smaller particles. The greater efficiency associated with the present invention permits the use of a smaller sized or compact moving bed and results in the ability to effectively scrub flue gas containing a more highly concentrated mount of sulphur oxide. In addition, the greater efficiency associated with the present invention permits removal of sulphur oxides from the flue gas with minimum contact time between the flue gas and the scrubbing particles. Consequently, the scrubbing particles moving downward in the bed can be allowed to move at a greater velocity to produce two additional benefits. Firstly, operating the moving bed at a greater speed of downward moving particles helps keeps the particles in constant motion and thereby minimizes the possibility that the reaction product formed on the particle surfaces, will fuse or bridge the particles together. Secondly, the greater movement of the particles in the downward direction serves to abrade the particles and thus aids in the removal of the reaction crust. It has been observed that the system can be operated and the encrusted limestone particles can be regenerated without a separately installed attritor mechanical vibrator or similar device due to the action of the particles in the moving bed and a screw conveyor which conveys the particles from the bottom of the bed for their return to the top of the bed.

BRIEF DESCRIPTION OF THE DRAWINGS

FIG. 7 illustrates the reactors of the invention contained within a housing.

FIG. 8 is a cross-sectional view of the moving bed reactors along line A—A of FIG. 7.

FIG. 9 is a view of the apparatus along line B—B of FIG. 7.

FIG. 10 shows an abrasive device which may be used to regenerate the limestone in this invention.

DETAILED DESCRIPTION OF THE INVENTION AND PREFERRED EMBODIMENTS

Figure 1:
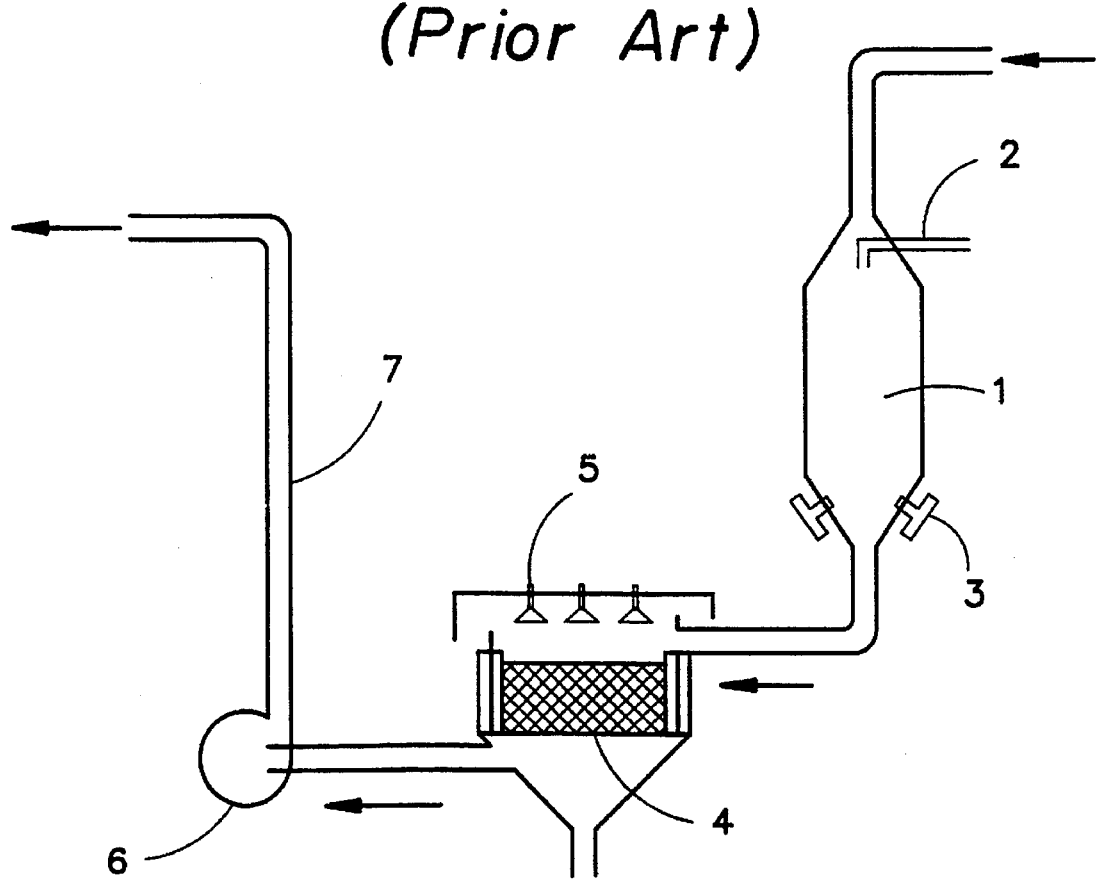
FIG. 1 is a schematic representation of a prior art fixed bed limestone emission control device.
Figure 3:
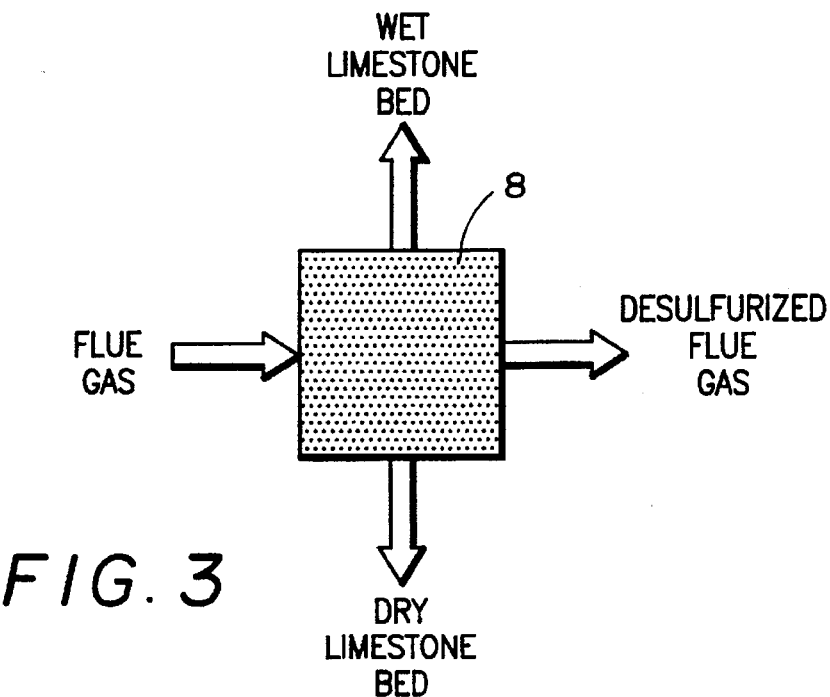
FIG. 3 is a schematic representation of the flow of gas through a moving bed of wet limestone particles.

The limestone emission control system and moving bed therefor may employ standard sized limestone particles to remove sulphur oxides from gas such as coal fired oiler flue gas. In the process, hot flue gas is contacted with a moving bed of limestone particles which can vary in size from 1/32" to 1/4" in diameter. The limestone granules are coated with a water film so that the sulphur oxides can be absorbed from the flue gas into the water film where it subsequently reacts with dissolved limestone. A layer or crust of reaction product, primarily calcium sulphate and calcium sulphite, forms on the limestone granules as the reaction proceeds. The humidity of the flue gas may be raised by conditioning the gas with a water spray or live steam through the use of appropriate nozzles or injectors as illustrated in FIG. 1. Likewise the limestone may be wet by conventional sprayers as shown in FIG. 1. Enough water may be added to the top of the moving bed of limestone particles so that the limestone particles remain wet until they reach the bottom of the moving bed where they can be discharged as dry particles. As shown in FIG. 3, the film of water evaporates as the particles descend through the moving bed 8 due to the action of the hot flue gas passing through the bed in a generally horizontal direction. Thus the flue gas enters the wet limestone bed 8 on one side, the reaction proceeds as the gas passes through the bed and then the desulfurized gas exits from the opposite side of the bed as illustrated in FIG. 3.

Although the system may be operated so that the limestone exits the bed in the dry state, it is desirable to keep the limestone wet for as long a period as possible because if the limestone particles dry out prematurely before they reach the bottom of the bed, then the lower portion of the bed containing the dry particles will be essentially inactive. The position in the moving bed where the particles pass from the wet state to the dry state is the drying front. The position of the drying front can be controlled by known techniques whereby the parameters which determine the position of the drying front are regulated. These parameters include temperature and humidity of the flue gas, the length of the bed and the speed of downward moving limestone particles. If the flue gas is conditioned to saturate it with water, then there would be little or no evaporation of water from the particles. In that case, the particles will remain wet throughout the moving bed. The humidity may be regulated to increase the evaporation of water from the particles so that the drying front occurs at the point where the particles exit at the bottom of the bed. Humidity regulation may be achieved by known conditioning techniques which involve the introduction of water or steam into the flue gas. The location of the drying front can be further regulated by increasing or decreasing the downward speed of the limestone particles through the bed and by the addition of water to the particles. For any particular level of gas temperature and humidity which produces evaporation, the drying front can be moved downward or upward by respectively increasing or decreasing the downward speed of limestone particles through the bed. The downward speed of the particles in the gravity bed my be regulated by the rate at which the particles are removed from the bottom of the bed.

Figure 2:
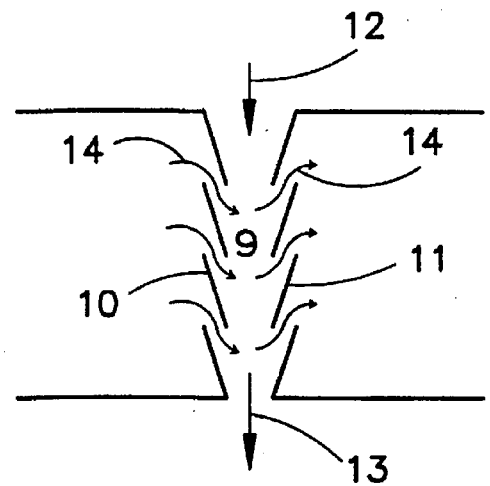
FIG. 2 is a cross-sectional view of a conventional louvered moving bed reactor.

The invention may use a typical louvered gravity bed such as the bed shown in FIG. 2. The bed shown generally by reference numeral 9 in FIG. 2 is situated between a series of inlet louvers 10 and outlet louvers 11. Particles enter the bed from the top as shown by arrow The particles flow downward due to the force of gravity and then exit the bed at the bottom as shown by arrow 13. A stream of gas enters the bed through the spaces between the inlet louvers; passes through the bed and then exits the bed through the spaces between the outlet louvers. The general flow of the gas is depicted by the arrows 14.

The louvers are plates which support the particles in the moving bed and therefore, the size and shape of the bed is defined by the placement of the louvers. Typically, the inlet and outlet louvers are identical to each other and are horizontally mounted on an angle on the inlet and outlet sides of the moving bed and are sized and configured so that the particles can move downward by gravity without falling out of the bed. Each louver has a width which extends in a horizontal direction so as to define the width of the bed and each louver has a length which is perpendicular to its width.

The inlet side of the moving bed is a vertical wall comprised of a plurality of spaced apart horizontally mounted generally parallel flat plates which form a vertical stack of overlapping horizontal louvers whereby the spacing between the overlapping louvers define passages for the passage of gas therethrough (louver inlets).

The vertical wall of louvers which comprise the inlet side of the bed preferably lies along to a vertical plane. Each inlet louver is angled with respect to this plane so that one horizontal edge is higher than the other horizontal edge with the lower edge of each louver being closer to the center of the bed than the upper edge so that the particles do not fall out of the bed on their downward passage. Generally, sharp or narrow angles are preferred with an angle of about 20° from the vertical being most preferred. A 20° angle results in louvers having a 70° slope.

The outlet side of the moving bed is also a vertical wall comprised of a plurality of spaced apart horizontally mounted generally parallel flat plates which form a vertical stack of overlapping horizontal louvers whereby the spacing between the overlapping louvers define passages for the passage of gas therethrough (louver outlets). The vertical wall of louver which comprise the outlet side the bed preferably lies along a vertical plane which is spaced apart from the vertical wall of inlet louvers so as to define the thickness of the bed through which the gas will pass. Each outlet louver is angled with respect to the vertical plane so that one horizontal edge is higher than the other horizontal edge with the lower edge of each louver being closer to the center of the bed than the upper edge so that the particles do not fall out of the bed on their downward passage. Thus, it is to be noted that the louvers on both the inlet and outlet sides of the moving bed are similarly constructed.

Generally, sharp or narrow angles are preferred for angling the louvers with an angle of about 20° from the vertical being most preferred. Preferably, the inlet and outlet louvers are the same with equal angles, spacings and overlap so that the inlet and outlet sides of the moving bed are bilaterally symmetric with respect to the column of particles which form the bed.

The inlet and outlet louvers are angled and spaced so that there is sufficient overlap to prevent the particles from falling out due to their downward movement in the bed. A 3½" overlap is preferred. Although the angle and overlap will prevent the particles from falling out due to the downward movement of the particles in the bed, some particles will leave the bed through the spaces between the outlet louvers due to the force of the gas stream passing therethrough. Consequently, the present invention provides a mechanism for removing these particles and preventing them from being entrained in the gas flow in order to prevent the particles from damaging the system, especially the ID fan or fans associated with the system.

Figure 5:
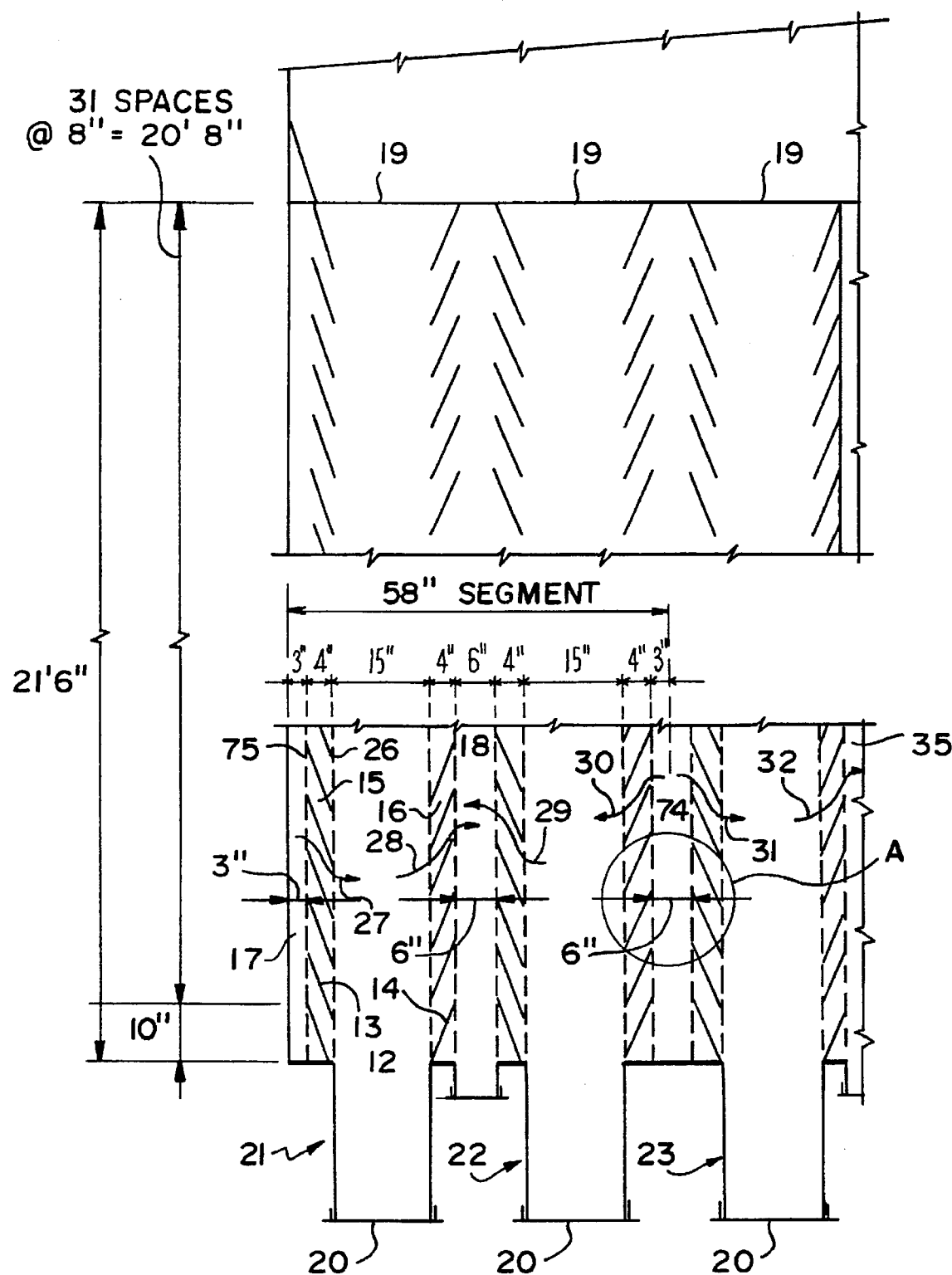
FIG. 5 is a cross-sectional illustration of an embodiment of the invention which uses a plurality of moving bed reactors.

FIG. 5 illustrates an embodiment of the invention which uses a plurality of moving bed reactors, each of which has louvers as described above. Each moving bed reactor is capable of holding a moving bed of limestone particles which move downward due to the force of gravity. One of the moving bed reactors shown generally by reference numeral 21 in FIG. 5 is defined by the space 12 located between a vertical stack of inlet louvers, one of which is indicated by reference numeral 13, and a vertical stack of outlet louvers, one of which is indicated by reference numeral 14. Additional moving bed reactors are generally shown by reference numerals 22 and 23 in FIG. 5. It will be appreciated that one can make the bed taller or shorter depending upon the number of louvers utilized. The louvers are spaced apart from each other in a vertical direction so as to create inlet spaces (louver inlets), one of which is shown by reference numeral 15, and outlet spaces (louver outlets), one of which is shown by reference numeral 16. In operation, the flue gas, which may be conditioned to a desired temperature and/or humidity, is directed toward the inlet side of the moving bed reactor by a chamber or conduit such as the inlet 17. The inlet is preferably in the form of a slot which extends vertically along the entire reactor so that the flue gas can be evenly distributed via the inlet spaces such as inlet space 15. The flue gas passes through the inlet spaces and traverses space 12 before exiting the reactor through the outlet spaces. The gas flow is preferably effected by means of an ID fan which is located downstream from the reactor. As the gas traverses space 12, it will come in contact with limestone particles when the particles are on their downward gravity driven descent through the moving bed reactor. The particles are shown by reference numeral 53 in FIGS. 7 and 8.

Scrubbing particle inlets 19 are provided on the top of the reactor for the introduction of limestone particles therein. Scrubbing particle outlets 20 are provided on the bottom of the reactor for the removal of limestone particles therefrom.

The flue gas passes into a receiving chamber such as an outlet chamber or conduit 18 after it exits through the outlet spaces. The outlet is preferably in the form of a vertically extending slot which lies along side the entire outlet side of the moving bed reactor.

Conventional devices such as live hoppers may be used in conjunction with the scrubbing particle inlets at the top of the bed so as to prevent leakage of ambient air into the outlet gas slot. The scrubbing particle outlets at the bottom of the bed are adapted for linkage to conventional screw conveyors such as the twin screw conveyors 24 shown in FIG. 8.

Preferably a plurality of moving bed reactors will be used. When a plurality of reaction are used, they are preferably contained in a housing such as housing 25 shown in FIG. 7. In addition, when a plurality of reactors are used, they are preferably arranged so that outlet and inlet slots may be shared by adjacent reactors. For example, adjacent reactors 21 and 22 share outlet slot or chamber 18. Likewise, reactors 22 and 23 share inlet slot 74. However, the invention does not require this type of sharing.

The inlet louvers of each reactor are preferably sized and angled so that their upper edges lie along one vertical line and their lower edges lie along a second vertical line wherein the first and second vertical lines are spaced apart from each other. For example, in reactor 21, inlet louvers 13 are sized and arranged so that their upper edges lie along vertical dashed line 75 while their lower edges lie along vertical dashed line 26. Lines 75 and 26 are 4" apart in the embodiment shown in FIG. 5. The remaining inlet and outlet louvers are similarly arranged in the embodiment shown in FIG. 5 so as to create louvered inlets and outlets which are 4" thick. In the embodiment shown in FIG. 5 the stacks of inlet and outlet louvers are spaced apart to create a 15" thick space for the moving bed reactor.

It will be appreciated from the foregoing description that the flue gas will flow into space 12 of reactor 21 via the spaces between the inlet louvers. In FIG. 5, arrow 27 shows this flow through one representative space. After passing through reactor space 12, the gas will exit via corresponding spaces between the outlet louvers. Arrow 28 illustrates this flow through one such representative space. The gas exiting the reactor 21 enters the outlet slot 18. Likewise, gas from reactor 22 passes through its own outlets in a similar manner. Arrow 29 shows gas entering outlet slot 18 from reactor 22 through one of the representative spaces through which the gas passes. Thus, the gas which flows through the outlets from adjacent reactors 21 and 22 passes into a common outlet slot 18. Likewise, gas flowing through inlet slot 74 passes into adjacent reactors 22 and 23 through the spaces between the louvers. Arrows 30 and 31 illustrate the direction of flow of the gas through one representative space between the inlet louvers for reactors 22 and 23. Arrow 32 shows gas exiting reactor 23 in the same manner as described for reactor 21. Once the gas enters the outlet slots, it can then be directed to the stack for elimination into the atmosphere by known technology.

It will be readily apparent from the foregoing description that the overall flow of flue gas through the reactors will be as shown in FIG. 7. FIG. 7 shows the same reactors and related inlet and outlet slots as discussed above with reference to FIG. 5 since FIG. 5 is a cross sectional view along line A—A of the reactor shown in FIG. 7. It will be appreciated that the cutaway section of FIG. 7 shows only two complete inlet and outlet slots. However, additional slots which are not shown are contained within the housing 25 and they have the same structure as the ones which are illustrated in the drawings.

As shown in FIG. 7, flue gas from the furnace enters housing 25 via duct or inlet plenum 64 in a direction shown by arrow 36. The inlet slots 17 and 74 have open ends which communicate with the gas flowing into housing 25 so that the gas enters the inlet slots as shown by arrows 33. Gas entering the housing can only enter into the outlet slots by passing through the reactor beds. Thus, the gas passes through reactor beds such as reactor beds 21, 22 and 23 and into their corresponding outlet slots as shown by arrows 34. Each of the outlet slots has an open end which communicates with a downstream portion of the housing so that the gas exits the outlet slots as shown by arrow 37 and then exits housing 25 via duct or outlet plenum 65. This gas can then be directed to a stack for elimination according to known techniques. The inlet and outlet slots are arranged according to known techniques within the housing so that, in operation, all of the gas must pass through the reactors in the manner described before elimination into the atmosphere.

Figure 6:
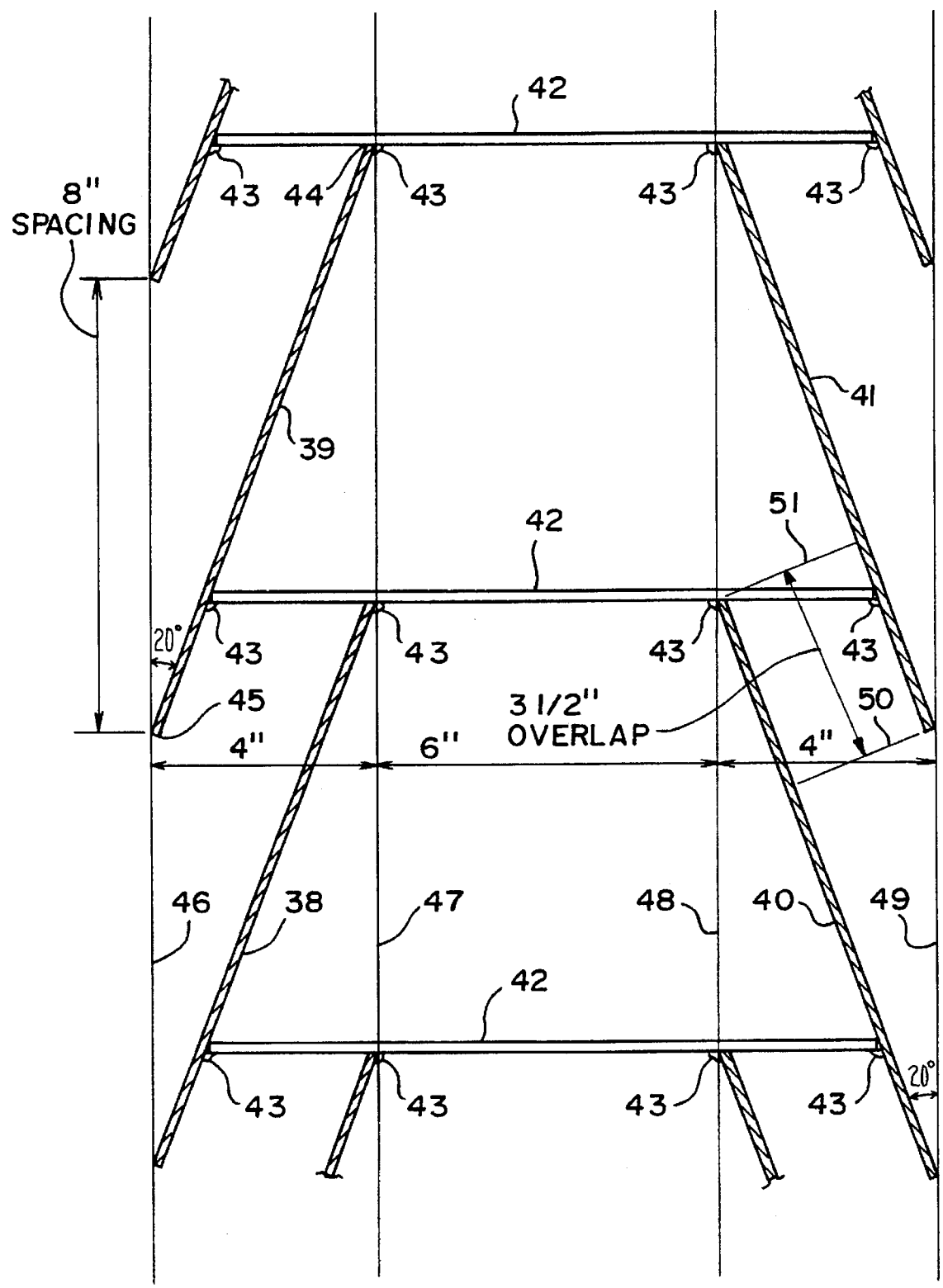
FIG. 6 illustrates the details contained in Circle A of FIG. 5.

FIG. 6 shows a detailed view of a portion of the louvers which are within circle A in FIG. 5. In FIG. 6, louvers 38 and 39 are inlet louvers which are associated with reactor 22. Louvers 40 and 41, which correspond respectively to louvers 38 and 39, are inlet louvers associated with reactor 23. The louvers shown in detail in FIG. 5 are representative of the louvers used in the embodiment of the invention illustrated in FIGS. 5–9.

Each pair of corresponding louvers between adjacent reactors may be held in place by means of horizontal bars or the like such as bars 42 shown in FIG. 6. In FIG. 6, the louvers are held in place by weld joints 43. Each louver has a horizontal upper edge 44 and a horizontal lower edge 45. The horizontal edges lie along parallel vertical planes shown by lines 46, 47, 48 and 49 in FIG. 6. The distance between lines 46 and 47 and the distance between lines 48 and 49 is 4 inches in the embodiment shown in FIG. 6.

The louvers shown in FIG. 6 are 11" long (i.e. the distance between the upper edge 44 and the lower edge 45 is 11"). The lower edges of the louvers in a given reactor inlet or reactor outlet are preferably spaced 8" apart as shown in FIG. 6. Furthermore, the louvers shown in FIG. 6 are angled at 20° as measured from a vertical line. For example, the inlet louvers associated with reactor 22 are angled at 20° with respect to vertical line 46 and louvers 40 and 41 are angled at 20° with respect to vertical line 49.

The arrangement of the louvers as shown in FIG. 6 produces louver inlets having a 4" thickness due to the distance between lines 46 and 47 and the distance between lines 48 and 49. Also, as shown in FIG. 6, each of the louvers has a 3½" overlap with respect to the adjacent lower louver. This overlap is shown in FIG. 6 as the distance between parallel lines 50 and 51 which are perpendicular to louvers 40 and 41. The outlet louvers have the same geometric relationships as described above with respect to the inlet louvers.

In FIG. 6, the distance between the corresponding inlet louvers associated with the two reactors defines the width of the inlet slot. Thus, in FIG. 6, a 6' inlet slot (corresponding to inlet slot 74 shown in FIG. 5) is formed due to the 6" distance between lines 47 and 48. This same type of arrangement is used to form 6" wide outlet slots such as outlet slot 18 shown in FIG. 5.

As noted above, one of the advantages of the present invention is that the flue gas can flow through the apparatus at a high superficial velocity. The superficial velocity through the reactor is the velocity of the gas as measured without the scrubbing particles being present. Flowing the gas through a given reactor at a specified superficial velocity will allow a specific volume of gas to flow through the reactor per unit time (flow rate). In order to maintain the gas flow rate when the bed contains particles, it is necessary for the gas to flow through the bed of particles at a velocity which is actually much higher than the superficial velocity. This is because the particles restrict the gas flow by confining the flow of gas to the space between the particles. This higher gas velocity produces the carry-over problem when gas is flowed through the reactor at a flow rate which is equivalent to the flow rate associated with a high superficial gas velocity. In a preferred embodiment of the invention, the outlet slots are sized to have a cross sectional area so that the velocity of the gas passing therethrough is insufficient to entrain any carry-over particles which fall into the slot as the gas exits the reactors through the spaces between the outlet louvers. In the embodiment shown in FIGS. 5–9, the outlet slots are 6" across and extend along the width of the reactor. Consequently, the cross-sectional area for the outlet slot is sufficiently large so that the carry-over particles are not entrained in the flow of gas. Thus, the carry-over particles which enter the outlet slot will fall to the bottom. In order to recover these particles, the bottom of each outlet slot communicates with a means for recovering the particles. Suitable means include a screw conveyor such as the screw conveyor 52 shown on the bottom of outlet slot 18 in FIG. 8. Thus, in operation, the flue gas will flow through the stone contained in the reactors via the inlet and outlet slots and, any carryover stone which enters the outlet slots will fall down and be collected and recovered by screw conveyor 52. The gas leaving the outlet slots will be substantially free of carry-over particles due to the lower velocity of gas passing therethrough. Therefore, the gas which exits the outlet slot on its way to the exhaust stack will be free of the problem associated with carryover particles entrained therein.

The louvers may be made of any material which is known for constructing equipment which comes in contact with hot acid gas such as flue gas. Preferably the louvers are stainless steel plates having a thickness of about ⅛" or more. 304 stainless steel is suitable for making the louvers.

The screw conveyors 24 which are located on the bottom of each reactor bed can be regulated by variable speed drive motors, one of which is shown by reference numeral 54 in FIG. 9. The variable speed drive motor can be used to vary the rate at which the screw conveyors rotate and thus they can be used to vary the downward movement of the particles in the moving bed reactors.

FIG. 9 also shows a drive motor 55 which operates the screw conveyor 52 located at the bottom of the outlet slots. The drive motor used to operate screw conveyor 52 does not have to be variable although variable speed drive motors could also be used to operate these screw conveyors. In the embodiment illustrated in FIGS. 5–9, a single 6" screw conveyor with a rotary airlock is used to remove the carry-over particles. This conveyor should have a direct drive motor and a two ton per hour capacity. The stone may be transported through the screw conveyor into a rotary. airlock. In that case, the airlock requires the capacity. and motor drive to match the screw conveyor.

The limestone particles which enter the screw conveyors 24 will generally not need regeneration due to the abrasive action in the moving reactor bed and screw conveyor. Thus, the limestone particles which enter screw conveyor 24 may be returned to the top of the reactor without any specific agitator for removing the reaction crust from the particles. However, it is preferable to remove fines and dislodged crust from the particles by passing them over a filter screen or similar device before the particles are returned to the top of the reactor. The screen should be capable of removing fines and dislodged crust which are small enough to become entrained in the gas flowing through the slots. The carryover particles which are recovered and moved by screw conveyor 52 may be combined with the limestone particles before being returned to the top of the reactor. The carry-over particles and the particles from the bottom of the reactor may be returned to the top of the reactor by known devices or combination of devices including conveyor belts, screw conveyors, bucket elevators and the like.

Figure 4:
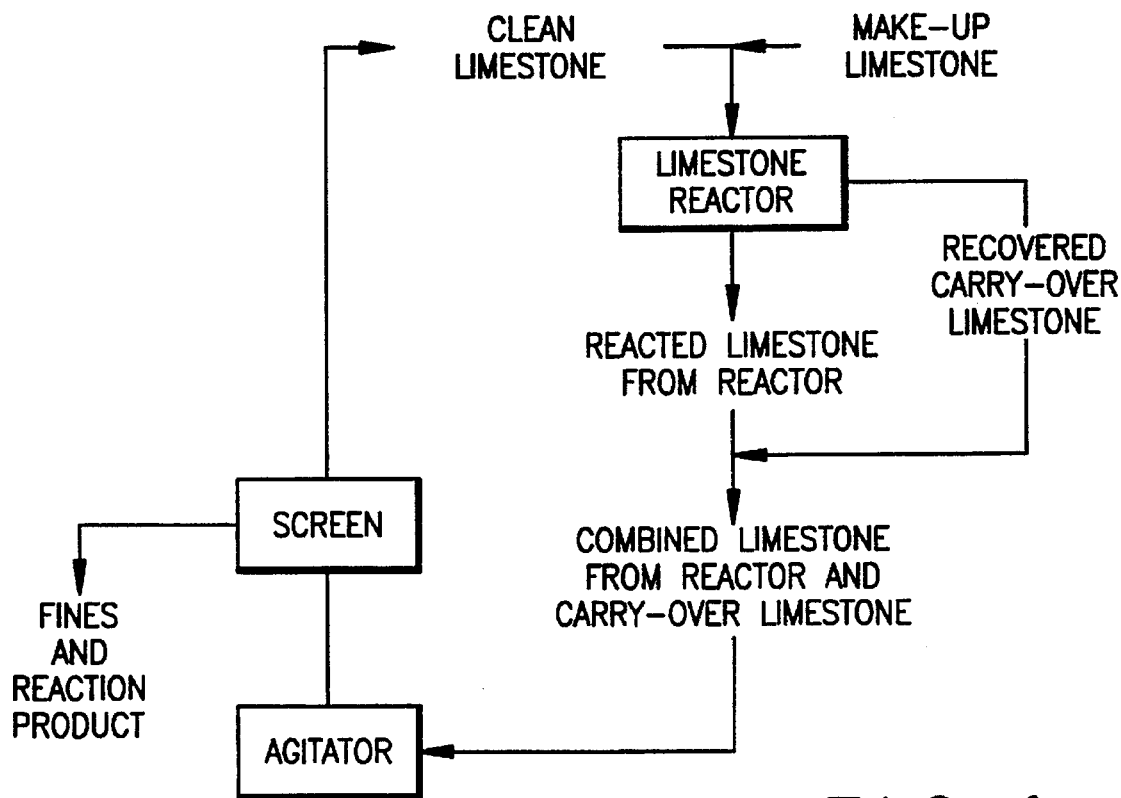
FIG. 4 is a schematic representation of the overall system in which the limestone reactor of the present invention is used.

The overall system in which the invention can be used is schematically illustrated in FIG. 4. In FIG. 4, recovered carry-over limestone is conveyed from the outlet slot and may be combined with reacted limestone from the bottom of the reactors. The limestone particles my then be conveyed to a conventional agitator or attritor if further abrasion or attrition of the particles is desired for regeneration. However, in the preferred embodiment, this is not necessary due to the abrasion which occurs in the moving bed. The particles may bypass the agitator or attritor or alternatively the agitator or attritor may be omitted if sufficient regeneration of the particles takes place in the reactor. Next, the particles are conveyed to a screen to remove flues and reaction crust. The screen may be an integral part of the agitator or attritor. Other types of conventional particle separation devices may be used in place of a screen in order to separate the fines and reaction material from the particles.

Fresh make-up limestone may be added at any point in the circuit, preferably up-steam of the agitator as shown in FIG. 10.

Suitable devices for removing the reaction crust from the limestone includes agitators such as the one illustrated in FIG. 10. The agitator illustrated in FIG. 10 includes a feed mechanism 56 for adding limestone particles 57 to mixing chamber 58. A rotatable shaft 59 with mixing arms 60 mounted thereon is contained in chamber 58. An outlet 61 is provided at the bottom of the chamber. In operation, limestone particles are fed into chamber 58 as shaft 59 turns so that the arms abrade the limestone particles contained therein. The particles exit the chamber through outlet 61. The chamber may be of double wall construction so that cooling water may be circulated between the walls through inlet 62 and outlet 63. Grinding media and/or grinding aids may be included in the chamber to assist the abrasion which takes place therein. The ginding may be conducted wet or dry.

The limestone may be No. 9 screen size (AASHTO No.9; Dp=0.10") which has an average diameter of 0.1" or slightly larger screen size No. 8 (AASHTO No.8; Dp=0.28') having an average diameter of 0.28". No. 9 mesh limestone particles are preferred became they have a smaller size and a larger surface area to volume ratio.

The superficial gas flow velocity through the bed can vary from 0.3 to 1.6 feet per second, preferably from 0.5 to 1.6 feet per second. Preferably, the superficial velocity is about 0.75 feet per second especially when AASHTO No. 9 particles are used. It has been observed that when No. 9 mesh sized particles are used in the embodiments shown in FIGS. 5–9, a large amount of carry-over occurs. However, the features of the present invention makes it possible to use superficial velocities greater than 0.75 feet per second when No. 9 mesh particles are used particularly when the outlet slots are enlarged to reduce the velocity of the gas flow therethrough. The outlet slot should be sized so that the velocity of the gas passing therethrough is between 500 to about 1,500 feet per minute. The embodiment illustrated shows a minimum width of 6" for the outlet slots. This width can be extended to 7", 8" or more to limit the velocity through the outlet slots so that the particles fall to the bottom where they can be recovered by the screw conveyors.

When No. 8 limestone particles are used in the embodiments illustrated in FIGS. 5–9, it was observed that superficial gas velocities greater than 1.2 feet per second can be used without incurring any carry-over problem.

As a result of the high superficial gas flow velocities which can be used in this invention, it is possible to efficiently scrub flue gas containing 500 to more that 3,000 ppmdv sulfur oxide. Although the embodiments illustrated in FIGS. 5–9 can easily scrub flue gas containing 3,000 ppmdv $SO_2$ without any difficulty, greater concentrations of $SO_2$ could be handled by increasing the bed depth (thickness).

The embodiment of the invention illustrated in FIGS. 5–9 may be operated under the following conditions:

inlet temperature: 100° F.–350° superficial gas velocity: up to 0.75 feet per second gas velocity in the outlet plenum: 25 feet per second (maximum)

The embodiment of the invention illustrated in FIGS. 5–9 is preferably operated with a limestone bed velocity of 1.4"/minute (maximum) and a limestone active residence time of 12 hours (maximum) and a water addition rate of 0.2 gpm/1000 acfm.

The above gas velocity limit is based upon a horizontal outlet duct fired to the commercial louver and slot design. The water addition rate noted above is a function of the limestone bed velocity, inlet gas temperature and superficial gas velocity. The 0.2 gpm/1000 acfm is based upon a 1.4"/minute limestone bed speed, a 250° F. inlet gas stream, and a superficial gas velocity of 0.5 ft./second.

While the present invention has been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims.

What is claimed is:

1. A method for removing sulphur oxide gas from combustion flue gas which comprises:

a. providing an apparatus for removing sulphur oxide gas from combustion flue gas, said apparatus comprising at least one louvered gravity moving bed reactor having a top and a bottom for containing a moving bed of scrubbing particles which move downward in the bed from the top to the bottom due to the force of gravity and which are capable of reacting with flue gas to produce a solid reaction product; said reactor having a louvered inlet side and a louvered outlet side; said louvered inlet side and said louvered outlet side being spaced apart from each other thereby defining a volume for containing said scrubbing particles between said louvered inlet side and said louvered outlet side; said louvered inlet side having overlapping inlet louvers with spaces between the inlet louvers for the passage of flue gas therethrough into said reactor; said louvered outlet side having overlapping outlet louvers with spaces between the outlet louvers for the passage of said gas therethrough out of said reactor; means for wetting said scrubbing particles so that they are wet while they are in said reactor; means for flowing flue gas through said reactor whereby said flue gas enters the reactor through the louvered inlet side and exits said reactor on the louvered outlet side; said means for flowing flue gas through the reactor being means for flowing said gas through the reactor at a velocity to eject a portion of the scrubbing particles from the louvered outlet side of the reactor and said apparatus further including a chamber for the passage of flue gas therethrough; said chamber being located alongside the louvered outlet side of said reactor for receiving said flue gas which exits said reactor and for receiving scrubbing particles which are ejected from said louvered outlet side of the reactor; said chamber being sized so that the velocity of said gas which enters said chamber is insufficient to entrain at least a portion of the ejected scrubbing particles within the gas flowing through said chamber; said chamber having a bottom portion for collecting said ejected scrubbing particles;

b. flowing said flue gas through a moving bed of wet limestone scrubbing particles which move by gravity downward through said reactor wherein flue gas enters said reactor through said louvered inlet side and exits said reactor through said louvered outlet side; said flue gas being flowed through said scrubbing particles contained in said reactor at a velocity which ejects a portion of the scrubbing particles from the louvered outlet side of the reactor and said flue gas flows through said chamber at a velocity which is insufficient to entrain at least a portion of the ejected scrubbing particles whereby said portion of said ejected particles falls to the bottom of said chamber as the gas flows therethrough.

2. A method for removing sulphur oxide from combustion flue gas which comprises:

a. providing an apparatus for removing sulphur oxide gas from combustion flue gas, said apparatus comprising a plurality of louvered gravity moving bed reactors in side-by-side relationship; each reactor having a top and a bottom for containing a moving bed of scrubbing particles which move downward in the bed from the top to the bottom due to the force of gravity and which are capable of reacting with flue gas to produce a solid reaction product; each reactor having a louvered inlet side and a louvered outlet side; said louvered inlet side and said louvered outlet side being spaced apart from each other thereby defining a volume for containing said scrubbing particles between said louvered inlet side and said louvered outlet side; said louvered inlet side having overlapping inlet louvers with spaces between the inlet louvers for the passage of flue gas therethrough into each reactor; said louvered outlet side having overlapping outlet louvers with spaces between the outlet louvers for the passage of said gas therethrough out of each reactor; means for wetting said scrubbing particles so that they are wet while they are in said reactors; means for flowing flue gas through each reactor whereby said flue gas enters each reactor through the louvered inlet side and exits each reactor on the louvered outlet side; said means for flowing flue gas through each reactor inject a portion being means for flowing said gas through each reactor at a velocity to eject a portion of the scrubbing particles from the louvered outlet side of each reactor and said apparatus further including a plurality of chambers for the passage of flue gas therethrough; each of said chambers being located alongside the louvered outlet side of each reactor for receiving said flue gas which exits each reactor and for receiving scrubbing particles which are ejected from said louvered outlet side of each reactor; each chamber being sized so that the velocity of said gas which enters each chamber is insufficient to entrain at least a portion of the ejected scrubbing particles within the gas flowing through each chamber; each chamber having a bottom portion for collecting said ejected scrubbing particles; each chamber being in the form of an outlet slot which is co-extensive with said louvered outlet side of each reactor; said means for flowing the flue gas through each reactor includes an inlet slot which extends from the top to the bottom of said louvered inlet side of each reactor; means for introducing scrubbing particles into the top of each reactor and means for removing scrubbing particles from the bottom of each reactor and means for recycling the removed particles from the bottom of the reactors to the top of the reactors for feint reduction therein; means for removing particles from the bottom of the outlet slots and means for recycling said removed particles from the bottom of the outlet slot to the top of the reactors for reintroduction therein; said means for recycling the particles from the bottom of the reactors and said means for recycling the particles from the bottom of the outlet sloths includes a screw conveyor; said plurality of adjacent reactors in side-by-side relationship being arranged so that each reactor shares a common inlet slot or outlet slot with an adjacent reactor;

b. introducing limestone scrubbing particles into the top of each reactor whereby said particles move downward by the force of gravity to the bottom of each reactor; removing said particles from the bottom of each reactor; maintaining the scrubbing particles in a wet state during at least a portion of the time that said particles are in said reactors; said gas being flowed through the particles in each reactor at a gas flow velocity which ejects a portion of the scrubbing particles from the louvered outlet side of each reactor whereby said particles enter the outlet slots; flowing said gas which exits through the louvered outlet side of each reactor through said outlet slots at a velocity which is insufficient to entrain at least a portion of the scrubbing particles which enters said outlet slots whereby said particles fall to the bottom of said outlet slots; removing said particles from the bottom of each outlet slot; recycling said particles removed from the bottom of each reactor and outlet slot to the top of each reactor for reintroduction therein.

3. The method of claim 2 wherein the scrubbing particles are 1/32" to 1/4" in diameter and said particles are maintained in the wet state until they are removed the bottom of each reactor.

4. The method of claim 3 wherein the scrubbing particles are about 0.10" in diameter.

5. The method of claim 2 wherein the scrubbing particles about 0.28" in diameter.

6. The method of claim 2 wherein the inlet and outlet louvers of each reactor are arranged to form a vertical stack of overlapping inlet louvers and a vertical stack of outlet louvers, thereby forming a substantially vertical inlet and outlet side for each reactor; said vertical stacks of louvers for each reactor being about 15" apart to define a reactor bed which is about 15" thick; said inlet louvers and outlet louvers associated with each reactor bed being in the form of rectangular steel plates, each of which has an upper edge and a lower edge; said inlet louvers and outlet louvers associated with each reactor being mounted on about a 70° slope with the lower edge of each louver being closer to the reactor bed with which it is associated than the upper edge of each louver; said upper and lower edges of each louver being about 11" apart and said inlet and outlet louvers being vertically spaced apart from each other in each vertical stack of inlet and outlet louvers so that there is a vertical distance of about 8" between the lower edge of each inlet louver and a distance of about 8" between the lower edge of each outlet louver.

7. The method of claim 6 wherein the flue gas is flowed through outlet slots having a minimum width of 6".

8. The method of claim 6 wherein the superficial velocity is about 0.75 ft. per second.

9. The method of claim 6 wherein the scrubbing particles are 1/32' to 1/4' in diameter.

10. The method of claim 8 wherein the scrubbing particles are about 0.10" in diameter.

11. The method of claim 9 wherein the scrubbing particles are about 0.28" in diameter and said superficial gas velocity is 1.2'–1.6' per second.

12. The method of claim 10 wherein the scrubbing particles descend through the reactors at a velocity of 1.4" per minute and the limestone has an active residence time of 12 hours in the reactors.

* * * * *